(12) United States Patent
Brady et al.

(10) Patent No.: US 10,329,855 B2
(45) Date of Patent: Jun. 25, 2019

(54) CONTROL LINE ASSEMBLY AND FABRICATION TECHNIQUE

(71) Applicant: Schlumberger Technology Corporation, Sugar Land, TX (US)

(72) Inventors: Dominic Joseph Brady, Dhahran (SA); Gary Oddie, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 435 days.

(21) Appl. No.: 15/102,250

(22) PCT Filed: Dec. 5, 2014

(86) PCT No.: PCT/US2014/068761
§ 371 (c)(1),
(2) Date: Jun. 6, 2016

(87) PCT Pub. No.: WO2015/085156
PCT Pub. Date: Jun. 11, 2015

(65) Prior Publication Data
US 2016/0312547 A1    Oct. 27, 2016

Related U.S. Application Data

(60) Provisional application No. 61/913,005, filed on Dec. 6, 2013.

(51) Int. Cl.
*E21B 17/00* (2006.01)
*E21B 19/08* (2006.01)
(Continued)

(52) U.S. Cl.
CPC .............. *E21B 19/08* (2013.01); *B08B 5/02* (2013.01); *E21B 17/00* (2013.01); *E21B 47/00* (2013.01);
(Continued)

(58) Field of Classification Search
CPC .......... E21B 17/00; E21B 19/08; E21B 47/00; B08B 5/02; G02B 6/4459; G02B 6/4464; G02B 6/502
See application file for complete search history.

(56) References Cited

U.S. PATENT DOCUMENTS 3,598,873 A * 8/1971 Bloch ..................... C30B 13/00
568/749
5,275,038 A * 1/1994 Sizer ..................... E21B 17/203
340/854.7
(Continued)

FOREIGN PATENT DOCUMENTS

| WO | 2012112673 A2 | 8/2012 |
| WO | 2013033492 A1 | 3/2013 |

OTHER PUBLICATIONS

International Application No. PCT/US2014/068761, International Search Report, dated Apr. 14, 2015, 17 pgs.
(Continued)

*Primary Examiner* — Daniel P Stephenson

(57) ABSTRACT

A control line assembly and technique for fabricating the control line assembly are disclosed. The assembly includes drawn tubular segments through which a gas is flowed to purge contaminants. The outflow of contaminants due to the gas flow is monitored and the gas flow can be controlled and terminated when a sufficient quantity of contaminants has been extracted. The gas flow can be combined with a heat treatment cycle to further extract contaminants. The heat treatment cycle can include multiple heating stages that can be controlled based on the monitoring of the exiting contaminants.

20 Claims, 3 Drawing Sheets

(51) Int. Cl.
  *E21B 47/00* (2012.01)
  *B08B 5/02* (2006.01)
  *G02B 6/44* (2006.01)
  *G02B 6/50* (2006.01)

(52) U.S. Cl.
  CPC .......... *G02B 6/4464* (2013.01); *G02B 6/502* (2013.01); *G02B 6/4459* (2013.01)

(56) References Cited

U.S. PATENT DOCUMENTS

| | | | |
|---|---|---|---|
| 5,570,437 A | 10/1996 | Kluth et al. | |
| 6,042,369 A | 3/2000 | Bergman et al. | |
| 6,186,229 B1 | 2/2001 | Martin et al. | |
| RE38,052 E | 4/2003 | Kluth | |
| 7,163,055 B2 * | 1/2007 | Coon | E21B 23/08 166/250.01 |
| 7,646,953 B2 * | 1/2010 | Dowd | E21B 17/206 385/109 |
| 2006/0033919 A1 * | 2/2006 | Moshe | A24C 5/3412 356/430 |
| 2006/0260739 A1 * | 11/2006 | Varkey | B29C 47/0004 156/244.12 |
| 2007/0122104 A1 * | 5/2007 | Chalifoux | E21B 47/011 385/147 |
| 2009/0166042 A1 * | 7/2009 | Skinner | E21B 47/06 166/305.1 |
| 2009/0266562 A1 | 10/2009 | Greenaway | |
| 2010/0008632 A1 * | 1/2010 | Herbst | G02B 6/4415 385/109 |
| 2013/0284442 A1 | 10/2013 | Wilamowitz et al. | |
| 2014/0102796 A1 * | 4/2014 | Veneruso | E21B 47/011 175/57 |
| 2016/0312547 A1 * | 10/2016 | Brady | E21B 17/00 |

OTHER PUBLICATIONS http://www.polywater.com/airblow.html, Air-Assisted Fiber Optic Cable Installation, American Polywater Corporation, Jun. 5, 2015, 5 pgs.

Optoelectronics Research Centre, University of Southampton, "Field Test of the SD Fibre-Optic Pressure Sensor", Chevron's Fibre Optic Test Facility, Coalinga, CA Nov. 15, 1999, Chapter 7, 18 pgs.

Schmid, et al, "Optical Fiber Coatings", Chapter 4, DSM Desotech, Elgin, IL, Feb. 10, 2012, 28 pgs.

* cited by examiner

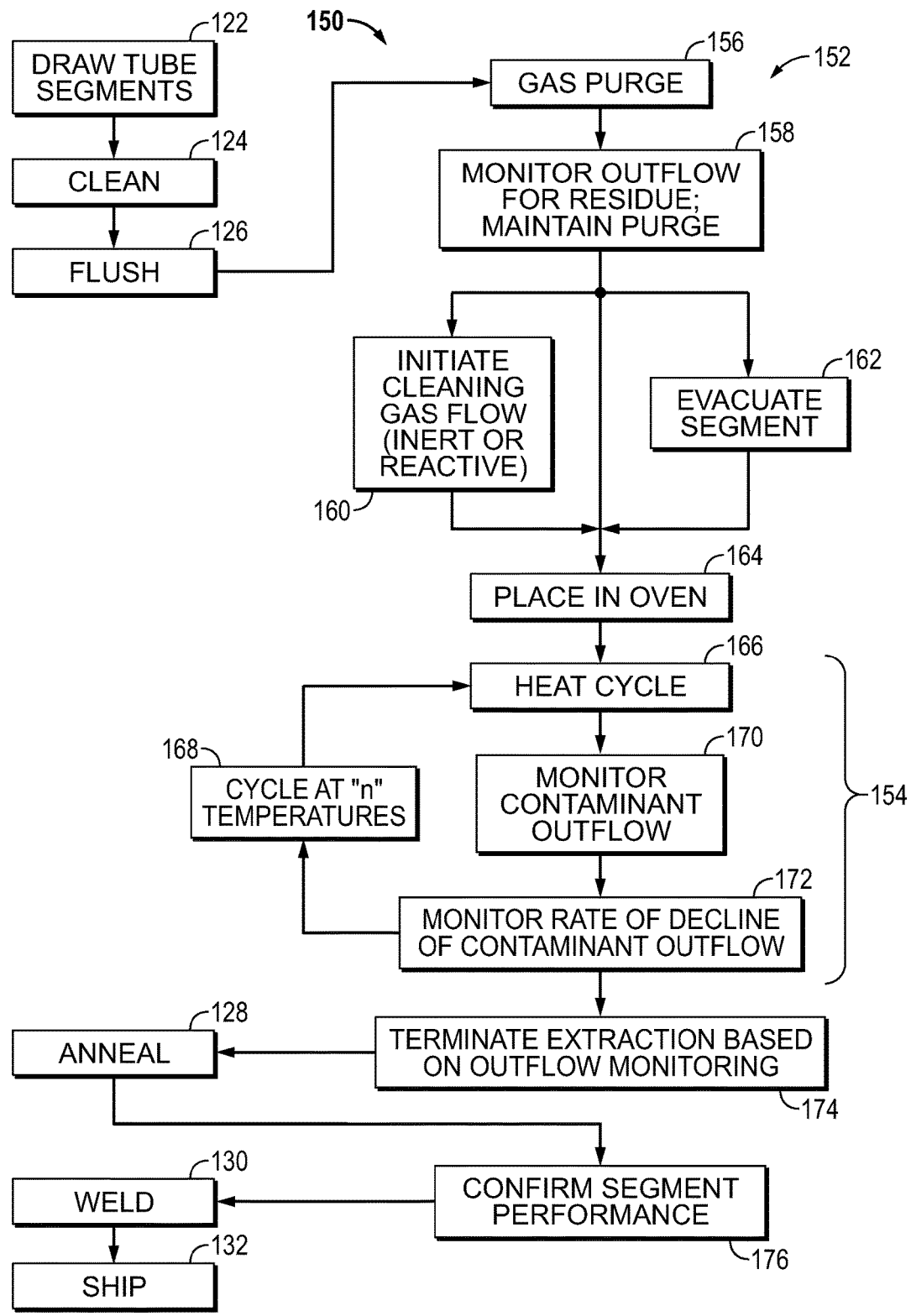

CONTROL LINE ASSEMBLY AND FABRICATION TECHNIQUE

RELATED APPLICATIONS

This application claims priority to U.S. provisional application Ser. No. 61/913,005, filed Dec. 6, 2013, which is incorporated by reference herein in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a control line suitable to pump a fiber optic line within. The fiber optic line can be used, for example, as a sensor to monitor downhole parameters or as a communications pathway between downhole components and surface systems.

SUMMARY

In some embodiments, a control line assembly is disclosed that is suitable for the deployment of fiber optics via a fluid pumping method. The assembly includes a plurality of drawn tubular segments, where each segment has an interior passageway that extends through its length. Contamination is removed from each drawn tubular segment by flowing a gas through the passageway during the fabrication process, monitoring the gas flow downstream to determine the amount of contaminants exiting the passageway, and terminating the gas flow when the amount of contaminants exiting the passageway is determined to be below a selected threshold. The drawn tubular segments are joined so that the respective passageways form a continuous passageway that extends through the entire length of the joined segments. The control line assembly can be deployed in a wellbore that penetrates a hydrocarbon-bearing earth formation. An optical fiber can be deployed within the continuous passageway of the control line. In some embodiments, the optical fiber can be used to provide a communications path between downhole components and a surface system. In some embodiments, the optical fiber can be used as a distributed sensor.

In some embodiments, a method of fabricating a control line is disclosed. A plurality of tubular segments are drawn, each of which has a passageway therethrough. A gas is flowed through the passageway to purge or react with contaminants during a process cycle that is performed at a temperature. The contaminants present in the outflow of gas is monitored at a downstream location. The flow of gas and temperature of the process cycle is controlled based on the monitoring of the outflow.

In some embodiments, a method is disclosed for removing contamination from a drawn tubular structure having an inner bore. To remove contamination, a gas is flowed through the inner bore. The gas flow is monitored downstream to determine the amount of contaminants exiting the inner bore of the tubular structure via the gas flow. The gas flow is controlled based on the monitoring.

BRIEF DESCRIPTION OF THE DRAWINGS

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

FIG. 3 is a flow diagram of an exemplary technique for fabricating a control line, according to an embodiment.

DETAILED DESCRIPTION

In the following description, numerous details are set forth to provide an understanding of the present disclosure. However, it will be understood by those skilled in the art that the embodiments of the present disclosure may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

In some embodiments, methods and systems for the fabrication of a smoothbore control line suitable for the deployment of an optical fiber or fiber optic cable via a fluid pumping method are disclosed. Techniques for producing such a control line without high performance chlorinated solvents, use of which has been excluded by recent regulatory changes controlling such substances, are disclosed.

The deployment of an optical fiber, or other cable or line, through an inner bore or passageway of a conduit (e.g., a control line, tube, pipe, etc.), such as via a fluid pumping or gas drag technique, can be sensitive to the surface finish of the wall of the inner passageway. In general, to ensure that a cable can be fully deployed within a control line without encountering any obstacles, the surface of the inner wall defining the bore or passageway of the control line should be relatively smooth and free of contamination.

Figure 1:
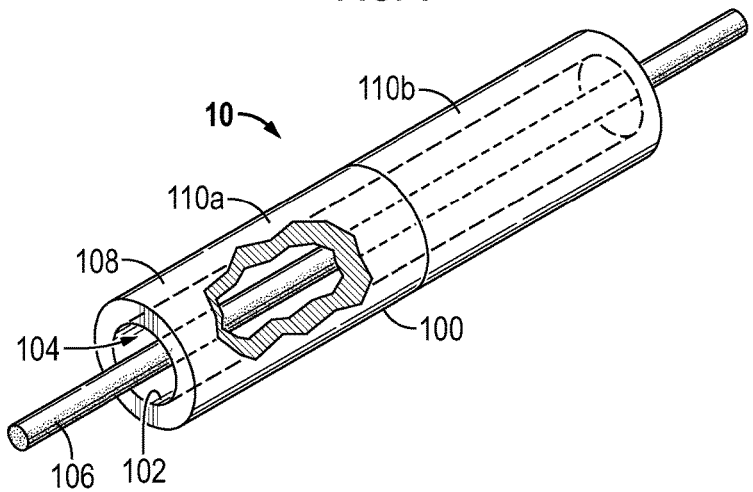
FIG. 1 is a schematic representation of an exemplary control line in which a fiber optic cable has been deployed, according to an embodiment.

An exemplary control line assembly 10 including a control line 100 having an inner wall 102 defining a passageway 104 in which an optical fiber 106 is deployed is shown in FIG. 1. In FIG. 1, a portion of an outer wall 108 that defines the outer diameter of the control line 100 is cut away to better illustrate the fiber 106 within the passageway 104. Also, as shown in FIG. 1, the control line 100 is made up of multiple segments 110a and 110b that have been connected together as part of the fabrication process to form the complete line 100. As an example, segments 110a and 110b can be joined using orbital welding, although other types of joining or coupling techniques are possible and contemplated. In some embodiments, the complete control line 100 can include only a single segment 110. In other embodiments, many segments 110 can be joined to form the control line 110, such as 20-30 segments.

In some embodiments disclosed herein, the control line 100 is fabricated from a strip of metal (e.g., stainless steel, inconel), which is rolled and seam welded into a tubular shape before being drawn in multiple stages to the dimensions that are suitable for the particular application in which the control line 100 is to be deployed. One technique 120 that has been used to fabricate a control line 100 is illustrated in the flow diagram of FIG. 2. According to this technique 120, at block 122 of the flow diagram, the control line 100 is formed by drawing tubes in sections (e.g., control line segments 110a and 110b).

Generally, the drawing process is a floating-plug method that is designed to provide a high quality metal finish on the surface of the inner wall 102 that defines the passageway 104 of the control line 100. The die that is used in the floating-plug method to draw the control line segment 110 is lubricated. The presence of this lubricant increases the risk of contamination within the control line bore 104. Generally, a variety of organic components can be used to lubricate the die used in the floating-plug process.

Figure 2:
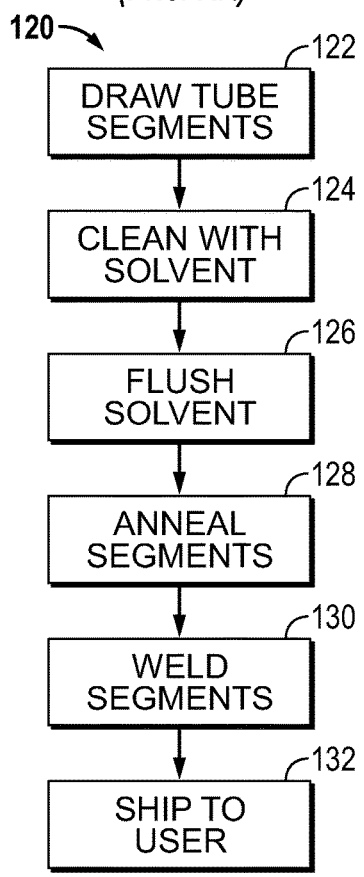
FIG. 2 is a flow diagram of a prior art technique for fabricating a control line.

As represented in block 122 of FIG. 2, multiple drawing operations are performed to sequentially reduce the control line 100 to the required dimensions. Between each drawing operation, the bore 104 is cleaned by flushing with a solvent to remove the lubricant (blocks 124 and 126). The line segment 110 is then committed to an anneal stage (block 128) to soften the material of the segment 110 sufficiently for the next operation, and to furnish the material in an appropriate condition for the final product. Annealing can be performed in a vacuum furnace, particularly for materials suitable for applications at the higher end of temperatures and pressures experienced in the oil and gas industry, such as Inconel 625.

In some embodiments, the length of the control line 100 that is needed for the environment in which it will be deployed is longer than the length that could be fabricated using a single reel of strip metal. Thus, in embodiments in which a longer length is desired, individual line segments 110 can be orbitally welded together to make a complete control line 100 (block 130) which then can be shipped to the end user (block 132).

Although typically 100-200 kilograms of strip metal are employed in the initial drawing process, not all of this material can be employed in the final control line 100 due to manufacturing defects. Thus, the resulting individual segments 110 can have a variety of different lengths, such as lengths that range between 64 meters and 1200 meters. These segments 110 can be welded together to produce a control line 100 having a length that is suitable for the application in which the control line will be deployed. This variation in length means that, in some segments 110, residual organics (e.g., solvent and/or lubricant) may not have had sufficient time to flow or diffuse out of the interior during the initial heating of the anneal phase in block 128. Consequently, the residual material left in the passageway 104 may be either carbonized or may re-condense on the surface of the inner wall 102 of the control line 100. This contamination can significantly disrupt the inner diameter of the control line 100 to the extent that the fiber 106 can be stopped at the location of the contamination during a fiber pumping operation, or in the event that the cumulative contribution of small amounts of contamination interacting with the fiber over a significant length results in the same effect.

In the past, risk of contamination was reduced by using chlorinated solvents to clean the line segments 110 during the drawing process (blocks 122-124). In environments in which chlorinated solvents cannot be used, such as when prohibited by regulatory authorities, a variety of other solvent materials have been used. However, many of these materials have proven to be less effective than chlorinated solvents. In the case of control lines fabricated for fiber-pumping, it has been demonstrated that these processes result in a contamination level in the interior of the line 100 that can prevent successful implementation of the pumping operation.

A possible solution to reduce this contamination would be to subject each control line segment 110 to an indeterminate increase in the time under vacuum before annealing (at block 126), which the fabricator might attempt to optimize on a trial and error basis. However, such a solution would not be practical as it would both be prohibitively expensive to perform and would be rife with uncertainties that would preclude implementation of any reasonable quality control. For example, it would not be possible to accurately account for changed thermal loading within the vacuum furnace with different lengths of line segments 110, thus requiring excess cost to ensure successful removal of the residual material due to a lack of ability to determine and implement sufficient process controls.

Accordingly, in some embodiments described herein, a fabrication process 150 is provided that includes a processing route 152 that can both ensure the cleanliness of the inner bore 104 of the control line 100 and provide an avenue to measure and/or confirm cleanliness. In this manner, the overall process 150 can be controlled for purposes of quality control. Further, such a fabrication method 150 can control the costs associated with the resulting product, as well as remove uncertainties and enhance the performance of the control line 100 for fiber pumping. Exemplary embodiments of fabrication method 150 and variations of processing route 152 will be described below with reference to FIG. 3.

In some embodiments, the type of die lubricant and solvents employed in the fabrication process 150 (blocks 122-124) for the control line 100 are known, thus allowing a priori investigation of these materials for their thermal properties, while allowing the study of the vapor pressure, mass loss, and any thermally induced phase or chemical transitions by well-known techniques such as differential thermal analysis (DTA), differential scanning calorimetery (DSC) and thermogravimetric analysis (TGA). This a priori information can be used to design a thermal profile for a heat-treatment process cycle 154 that can be part of the fabrication process 150 for the control line 100, where the cycle 154 is designed so that a desired volume (e.g., a maximum volume) of material is released into the vapor phase within the control line segments 110, while also limiting any irreversible chemical transitions that would result in a permanent deposition on the surface of the inner wall 104 of the control line segment 110, thus enhancing operational efficiency for lines requiring a high degree of internal cleanliness.

The heat-treatment process cycle 154 can have a thermal profile that includes multiple stages, with each stage have a time duration and a temperature. The time durations and temperatures of each stage can be different so that a desired level of extraction of difference components in the contamination left by the lubricant and solvent can be achieved. For example, components in the contamination may decompose at different temperatures. Thus, the stages of the cycle 154 can be configured so that particular components are extracted before the cycle 154 transitions to a next, higher-temperature stage. Factors which can influence the design of the heat cycle 154 include the type of material from which the segment 110 is made, the size (e.g., diameter and/or length of segment 110), the type and flow rate of purge or carrier gas, and the components in the lubricant and solvent. As an example, the time duration, temperature and pressure of each stage of the cycle 154 can be selected based on the thermal vaporization and degradation properties of the contaminants in the passageway 104.

Figure 5:
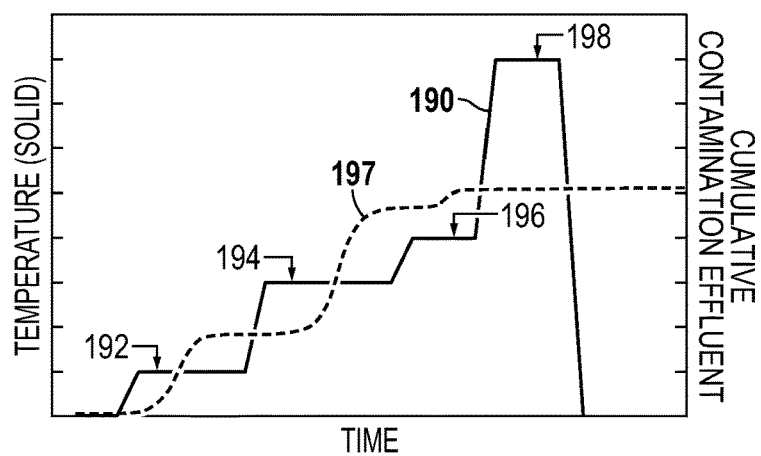
FIG. 5 illustrates an example of a thermal profile for heat treatment process cycle and an example of cumulative contamination extracted during multiple stages of the process cycle, according to an embodiment.

An example of a thermal profile 190 for an exemplary process cycle 154 is illustrated in FIG. 5, where the vertical axis for profile 190 represents temperature and the horizontal axis represents time. In this example, the cycle 154 includes three heat stages 192, 194, 196 before a final annealing stage 198, although any number of stages can be included. Each stage 192, 194, 196 is performed at a progressively higher temperature, which is selected to extract a different type of contamination component. The duration of each stage 192, 194, 196 can be pre-determined, or it can be controlled or adjusted in real time, as will be explained in further detail below.

Figure 4:
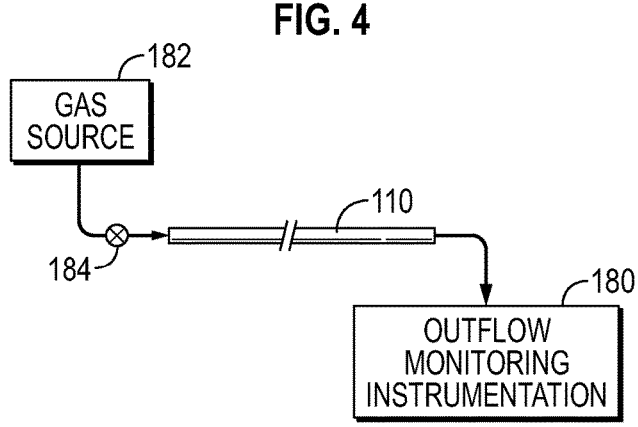
FIG. 4 is a schematic representation of an exemplary arrangement that can be used in the technique of FIG. 3, according to an embodiment.

With reference to FIG. 3, after the solvent material is flushed at bock 126, in some embodiments, the processing route 154 can proceed to a purge of each control line segment 110 with an inert carrier gas (e.g., nitrogen, argon, etc.) (block 156). For instance, as shown in FIG. 4, the segment 110 can be coupled to a gas source 182 and the flow of the gas can be controlled with an appropriate flow control valve 184. At block 158, the outflow of gas from the bore 104 of the line segment 110 can be monitored for residue (e.g., water, solvent, etc.) and the purge can be maintained until the monitored residue falls below an acceptable level at which detrimental contamination (e.g., contamination that would impede the passage of an optical fiber or cable) of the bore 104 will not occur. The outflow of gas can be monitored by appropriate instrumentation 180 that is coupled to or in-line with the segment 110.

In some embodiments, pressure control using the carrier gas can then be implemented to further purge or clean the bore 104 (block 160). In such embodiments, the pressure applied on the inner wall 104 of the control line segment 110 can be in the range of below atmospheric pressure to a high internal pressure, although typically the process would be expected to take place at up to 8 bar to drive flow through the tube against atmospheric pressure. The pressure that is used is selected to purge a desired amount (e.g., a maximum amount) of residual material from the bore 104. The particular pressure used can be selected based on knowledge of the type of carrier gas and the type of lubricant and solvents that have been used in the fabrication process 150, which can be combined with thermal information obtained from the thermal design stage to balance the temperatures, vapor pressures and flow assisted removal of material to optimize the process.

In such embodiments, the use of the pressure-controlled carrier gas purge allows pressure control on the inner diameter of the control line segment 110 to be independent of any pressure control on the outer wall 108 of the segment 110. As the presence of contaminants on the outer wall 108 will not affect the quality of the passageway 104 through the segment 110, the ability to control the pressure on the inner wall 104 independently of the outer wall 108 can enhance the quality of the final product 100 that is produced using fabrication process 150. This pressure control technique thus provides advantages over the existing practice of simply leaving the ends of the control line segment 110 open in the vacuum furnace, with no means of either measuring or controlling the pressure that is applied to the inner wall 104 of the control line segment 110.

In some embodiments, the processing route 152 can follow a path through block 162, in which the vacuum within the control line segment 110 can be made extremely high (e.g., evacuate so that there is no pressure) by connecting external vacuum pumps to the control line segment 110. This process at block 162 offers an advantage over existing techniques where the control line segment 110 is simply placed in a vacuum furnace by significantly reducing the surface area of material exposed to vacuum. Generally, a furnace that is large enough to handle the size of the control line segments 110 cannot achieve a vacuum that is as high as the vacuum that can be achieved by connecting an external vacuum pump to the segment 110. In some embodiments in which the process implements block 162, the vacuum furnace in its entirety can be eliminated, thereby significantly reducing fabrication costs and the plant that otherwise would be used to fabricate the control lines 100.

Regardless whether the processing route 152 includes block 160, block 162, both blocks 160 and 162, or skips blocks 160 and 162 entirely, the line segment 110 can then be placed in a furnace (block 164) (e.g., a vacuum furnace) in preparation for the annealing that occurs at block 128. At block 166, the contamination extraction heat cycle 154 is initiated. The heat cycle 154 can include one stage in which the segment is exposed to a selected temperature for a particular time duration, or cycle 154 can include multiple number of stages in which the segment 110 is exposed to different temperatures for particular time durations. The thermal profile of the heat cycle 154 is selected to achieve a desired level of extraction of the difference components in the solvent and the lubricant, where the number of stages, temperatures and time durations can be determined at least in part by techniques such as DTA/DSC and/or TGA (block 168).

In some embodiments, the parameters of the heat cycle 154 can be controlled, adjusted or tuned in real time based on monitoring of the outflow of contaminants from the interior of the control line segment 110. As an example, a stage of the cycle 154 can be terminated if the monitoring indicates that extraction of a particular contaminant component is substantially complete, and the cycle 154 can then transition to the next stage. As further examples, the time duration of a stage of the cycle 154 can be extended based on the monitoring of the outflow of contaminants, additional stages can be added, a stage can be eliminated, temperature of a stage can be adjusted, the cycle 154 can be terminated, etc.

Referring again to FIG. 5, the effect of controlling the heat treatment process cycle 154 by monitoring the outflow of contaminants can be seen by comparing the dashed line 197 with the solid temperature profile 190. The dashed line 197 represents the cumulative contamination effluent that is measured in the gas outflow as a result of the monitoring. As shown in FIG. 5, once the rate of extraction during a particular stage 192, 194, 196 declines to a desired level (e.g., levels off) for a period of time, the heat cycle 154 can then be transitioned to the next stage. Further, once the cumulative amount of contamination effluent reaches a desired level, the cycle 154 can be terminated and transitioned to the annealing stage 198.

In some embodiments, the pressure to which the interior of the control line segment 110 is subjected during the fabrication process 150 is dictated by thermal properties of the materials in question. In some instances, the pressure can be modulated with the temperature during the heat cycling 154 for further extraction of material from the line segment 110. The flow of the carrier gas also can be used to sweep or purge material through the control line segment 110, thus providing a positive flow of material out of the line, rather than simply waiting for material to diffuse out during the heat cycling 154. Consequently, more rapid transport of the contamination under the heat-treatment cycle 154 can be achieved. In some embodiments, the purge may be continuous, while in other embodiments, the purge can be reduced to achieve a known displacement volume once the process is established and defined. In embodiments, the flow rate of the gas can be constant or modulated. As an example, the flow rate of the gas can be constant within the range of 1 liter/minute to 200 liters/minute or can be modulated within that range, although other ranges are possible and contemplated depending on the tubing dimensions (e.g., outer diameter, wall thickness, etc.). In some embodiments, the flow rate is selected to achieve high Reynolds number flows to generate internal turbulence inside the tube, although this is typically limited to sub-sonic flows.

In some embodiments, the purge gas used in either block 156 or block 160 (and which can be continued during the heat treatment cycle 154) can include a reactive component to promote chemical reactions that speed up or facilitate the removal of the material into the vapor phase. The selection of a particular reactive component will depend on the specifics of the lubricant and solvent employed, the composition of the metal line segment 110, and the time/temperatures over which cleaning process occurs during the heat cycle 154. Reactive components can include oxygen, hydrogen, ozone, and nitrogen oxides, although a wide variety of halide based components also can be used. In some embodiments, a different gas composition can be used during different stages of the heat cycle 154. For instance, a stage of the heat cycle 154 can be performed under the flow of argon, while another stage of the heat cycle 154 can be performed under the flow of a reactive gas.

In some embodiments, an end of the control line segment 110 can be terminated with an apparatus 180 (see FIG. 4) that can detect the evolution of species from the interior of the control line segment 110 that is swept out in the carrier gas, including organic material and degradation products such as carbon dioxide (block 170). There are a multitude of ways of performing this detection, for example, the apparatus 180 can comprise a gas chromatograph, mass spectrometer, optical spectrometer or other volatile organic detector that looks for known signatures of the expected organic components, or the decomposition products therein (e.g., hydrogen, water, carbon oxides, etc.). In some embodiments, both the signature of the expected organic components and the decomposition signature can be monitored to provide averaged assurance on the temperatures that are actually experienced along the entire length of the control line segment 110. This monitoring can assist in identifying the presence of hot-spots within the treatment process that would otherwise cause the undesirable effects in an unmonitored system. In selecting the desired monitoring techniques, the technique(s) that is(are) selected should have the ability to both observe the range of contaminants, and observe mixtures of the contaminants simultaneously if expected to be co-evolved, or evolved sequentially. These techniques have the advantage of allowing interpretation of which species are being evolved preferentially at a given time. These instruments 180 can be connected directly in-line with the control line segment 110 or arranged to tap off a portion of the effluent for analysis, allowing each instrument to operate at its particular optimum pressure and flow conditions. This configuration therefore allows individual tuning of the heat cycle 154 as appropriate to the exact configuration of the interior of the furnace and the amount of control line segment 110, which would affect the principal attributes of the heat-treatment cycle 154 (i.e., temperature, time, pressure, flow rate, gas composition).

As an example, a stage of the heat cycle 154 can be terminated when monitoring of the contamination effluent indicates that extraction of contaminants under the conditions (e.g., temperature, pressure, flow rate, gas composition) of that stage is substantially complete. Substantial completion can be based on determination that the cumulative levels of extracted contaminants in the outflow from the interior of the line segment 110 has leveled off (i.e., has not substantially increased for a period of time). As another example, substantial completion can be based on determination that the rate of decline of extracted contaminants has fallen below a level where further benefit from that stage of the heat cycle 154 is outweighed by its cost.

A configuration where the heat cycle 154 is controlled or adjusted by monitoring the extracted contamination can thus optimize the cost of the product produced in each cycle 154. By monitoring the effluent (block 172), once a desired level of cleanliness is achieved (e.g., as determined, for instance, by monitoring the rate of decline of contamination outflow), a stage of the heat treatment cycle 154 can be terminated and/or the cycle 154 can be deemed complete. Thus, a given length of line segment 110 can be subjected to no more than the optimum treatment time to achieve cleanliness, resulting in a cost-efficient process, particularly when the final control line 100 comprises multiple segments 110 that must undergo treatment.

In some embodiments, once the clean/purge heat cycle 154 has been completed as determined based on the monitoring of the contamination effluent (block 174), the control line segment 110 can be committed to the full metal annealing temperature (block 128) with confidence that the process completed successfully to clean the bore 104 of contamination to the degree appropriate for the particular application in which the control line 100 will be used. For example, once the monitoring determines that the type, amount, and/or rate of decline of contaminants exiting the bore 104 are at acceptable levels (e.g., below a selected threshold), then the extraction process (i.e., the heat cycle and/or gas flow) can be terminated. In some embodiments, acceptable levels of contaminants can be determined based on prior knowledge of an amount of residual material that will result in contamination that will obstruct the passageway 104 by an amount that would impede deployment of the cable 106 therethrough. This amount will be dictated by the materials and dimensions of the control line 100 and the type of contaminant materials that are present in the passageway 104. It should be understood, however, that the fabrication techniques described herein can be used in other applications that may tolerate lower levels of cleanliness in the bore 104.

By monitoring the effluent during the clean/purge cycle 154, a full quality control record for the control line also can be generated.

In some embodiments, after annealing, each segment 110 of the control line can then be individually tested for cleanliness by pigging the segment 110 under flow/pressure conditions that are controlled to match those expected in the final control line 100 (block 176). This test provides a second independent confirmation that the interior of the control line 100 will be sufficiently clean for fiber pumping and can be performed before the segment 110 is welded into part of a larger assembly (block 130) and then shipped to the user (block 132). Consequently, a great deal of cost and uncertainty can be removed from the control line fabrication and the fiber pumping process.

Figure 6:
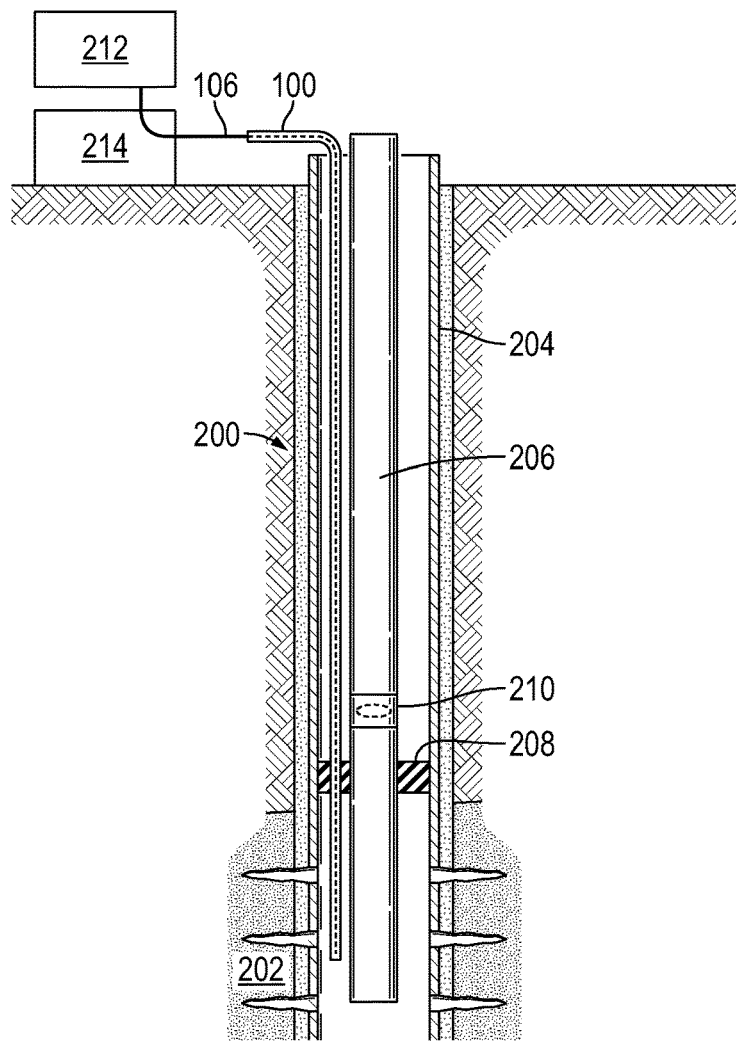
FIG. 6 is a schematic representation of an exemplary control line deployed in a hydrocarbon well, according to an embodiment.

In some embodiments, and as shown in FIG. 6, the control line 100 and the techniques for fabricating the control line 100 described herein may be employed to provide the control line 100 for an intelligent completion system disposed within a wellbore 200 that penetrates a hydrocarbon-bearing earth formation 202. Portions of the intelligent completion system, including the control line 100, may be disposed within cased portions of the well, while other portions of the system (including the control line 100) may be in the uncased, or open hole, portion of the well. The intelligent completion system can comprise one or more of various components or subsystems, which include without limitation: casing 204, tubing 206, control line(s) 100 (for electric, fiber optic, or hydraulic systems), packers 208 (mechanical, sell or chemical), flow control valves 210, sensors, in flow control devices, hole liners, safety valves, plugs or inline valves, inductive couplers, electric wet connects, hydraulic wet connects, wireless telemetry hubs and modules, and downhole power generating systems.

Portions of the systems that are disposed within the well 200 can communicate with systems or sub-systems that are located at the surface, such as surface communication system 212. For instance, an electric or fiber optic cable 106 can be deployed within the control line 100 and can provide a communications path between downhole components (e.g., valve 210) and surface system 212 or sub-systems. The surface system 212 or sub-systems in turn can communicate with other surface systems, such as systems that are at locations remote from the well 200. The control line 100 can be deployed in the well 200 using a conventional deployment system 214; the electric or fiber optic cable 106 can be deployed within the control line 100 using a fluid pumping system that is part of the system 214. In some embodiments the fluid pumping deployment system can be a gas drag system. In some embodiments, the electric or fiber optic cable 106 can be part of a downhole monitoring system. For example, the fiber optic cable 106 can include an optical fiber that is configured as a distributed temperature or vibration sensor that can respond along its length to temperature and/or pressure. The parameters monitored by the fiber optic cable 106 can be communicated to the surface system 212 in the form of optical signals that are reflected from the optical fiber 106.

Although the techniques and systems disclosed herein have been described relative to the fabrication of a control line into which an optical fiber or other cable or line is deployed by a fluid pumping technique, it should be understood that the techniques and systems are applicable to fabrication of or removal of contaminants from any type of conduit for which a relatively unobstructed inner bore or passageway is desired. It should further be understood that the techniques described herein need not include all of the processes disclosed, but that subsets and different combinations of the processes are contemplated and some of the processes may be performed in sequences different than those described and illustrated and may involve the use of different materials and different processing parameters (e.g., temperature, pressure, time, etc.) than those described. It should further be understood that all of these variations are contemplated and fall within the scope of the appended claims.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A control line assembly, comprising:
a plurality of drawn tubular segments, each drawn tubular segment having a passageway extending therethrough that is defined by an inner wall, wherein contamination is removed from each drawn tubular segment by flowing a gas through the passageway, monitoring the gas flow downstream to determine the amount of contaminants exiting the passageway, modulating the gas flow to control pressure within the passageway, testing each drawn tubular segment to confirm absence of contamination in the passageway, and terminating the gas flow when the amount of contaminants exiting the passageway is determined to be below a selected threshold, and
wherein the plurality of drawn tubular segments are joined so that the respective passageways form a continuous passageway that extends through the entire length of the joined segments.

2. The control line assembly as recited in claim 1, wherein contamination is removed from each drawn tubular segment by applying a heat treatment cycle to the tubular segment.

3. The control line assembly as recited in claim 2, wherein the heat treatment cycle is applied to the tubular segment while the gas is flowing through the passageway.

4. The control line assembly as recited in claim 1, further comprising a cable deployed through the entire length of the continuous passageway by a fluid pumping deployment system.

5. The control line assembly as recited in claim 4, wherein the cable comprises an optical fiber.

6. The control line assembly as recited in claim 5, wherein the control line assembly is deployed in a wellbore that penetrates a hydrocarbon-bearing earth formation to provide a communications path between a surface system and a downhole component via the optical fiber.

7. A method of fabricating a control line, comprising:
drawing a plurality of tubular segments, each segment having a passageway therethrough;
flowing a gas through the passageway to purge or react with contaminants in the passageway during a process cycle;
monitoring contaminant effluent in the outflow of gas exiting the passageway; and
controlling the gas flow and a temperature of the process cycle based on monitoring the contaminant effluent;
applying a plurality of heating stages to a tubular segment during the process cycle;
monitoring the contaminant effluent exiting the tubular segment during each of the heating stages;

terminating a heating stage based on a rate of change of the amount of contaminants in the contaminant effluent; and controlling pressure within the passageway independently of a pressure applied to the exterior of the tubular segment.

8. The method as recited in claim 7, further comprising modulating the flow of gas to control pressure within the passageway of the tubular segment while applying the heating stages.

9. The method as recited in claim 7, wherein the heating stages are performed at different temperatures.

10. A method of fabricating a control line, comprising:
drawing a plurality of tubular segments, each segment having a passageway therethrough;
flowing a gas through the passageway to purge or react with contaminants in the passageway during a process cycle;
monitoring contaminant effluent in the outflow of gas exiting the passageway; and
controlling the gas flow and a temperature of the process cycle based on monitoring the contaminant effluent;
applying a plurality of heating stages to a tubular segment during the process cycle, wherein the heating stages are performed at different temperatures;
monitoring the contaminant effluent exiting the tubular segment during each of the heating stages; and
terminating a heating stage based on a rate of change of the amount of contaminants in the contaminant effluent, wherein the time duration, temperature and pressure of the heating stages are based at least on the thermal vaporization and degradation properties of the contaminants in the passageway.

11. A method of fabricating a control line, comprising:
drawing a plurality of tubular segments, each segment having a passageway therethrough;
flowing a gas through the passageway to purge or react with contaminants in the passageway during a process cycle;
monitoring contaminant effluent in the outflow of gas exiting the passageway; and
controlling the gas flow and a temperature of the process cycle based on monitoring the contaminant effluent;
modulating the gas flow to control pressure within the passageway; and
testing each tubular section to confirm absence of contamination in the passageway; and joining the tubular section with another tubular section to form a continuous passageway therethrough if the absence of contamination has been confirmed.

12. The method as recited in claim 11, wherein controlling the gas flow and the temperature is based on the amount and type of contaminants present in the monitored effluent.

13. The method as recited in claim 11, further comprising joining the plurality of segments to form a continuous passageway therethrough.

14. The method as recited in claim 11, further comprising:
applying a plurality of heating stages to a tubular segment during the process cycle;
monitoring the contaminant effluent exiting the tubular segment during each of the heating stages; and
terminating a heating stage based on a rate of change of the amount of contaminants in the contaminant effluent.

15. The method as recited in claim 11, further comprising deploying the joined tubular sections in a wellbore that penetrates a hydrocarbon-bearing earth formation; and fluid pumping an optical fiber to deploy the optical fiber within the continuous passageway formed by the joined tubular sections.

16. A method for removing contamination from a tubular structure, comprising:
flowing a gas through a tubular structure having contaminants present within an inner bore;
monitoring the gas flow downstream to determine amount of contaminants exiting the inner bore of the tubular structure via the gas flow; and
controlling the gas flow through the tubular structure based on the amount of contaminants exiting the inner bore, wherein the gas includes a reactive component, and wherein monitoring includes monitoring reaction products of the contaminants with the gas that exit the inner bore, and wherein the gas flow further is controlled based on the monitored reaction products.

17. The method as recited in claim 16, wherein monitoring the gas flow further comprises monitoring the composition of contaminants exiting the inner bore; and wherein the gas flow is controlled based on the composition and rate of decline of the amount of contaminants.

18. The method as recited in claim 16, further comprising applying a heat treatment cycle to the tubular structure while flowing the gas and monitoring the gas flow, and controlling the heat treatment cycle based on the monitoring.

19. A method for removing contamination from a tubular structure, comprising:
flowing a gas through a tubular structure having contaminants present within an inner bore;
monitoring the gas flow downstream to determine amount of contaminants exiting the inner bore of the tubular structure via the gas flow;
controlling the gas flow through the tubular structure based on the amount of contaminants exiting the inner bore; and
applying a heat treatment cycle to the tubular structure while flowing the gas and monitoring the gas flow, and controlling the heat treatment cycle based on the monitoring, wherein monitoring the gas flow further comprises detecting thermal degradation products of the contamination.

20. A method for removing contamination from a tubular structure, comprising:
flowing a gas through a tubular structure having contaminants present within an inner bore;
monitoring the gas flow downstream to determine amount of contaminants exiting the inner bore of the tubular structure via the gas flow;
controlling the gas flow through the tubular structure based on the amount of contaminants exiting the inner bore;
applying a heat treatment cycle to the tubular structure while flowing the gas and monitoring the gas flow, and controlling the heat treatment cycle based on the monitoring;
testing the tubular structure to confirm absence of contaminants in the inner bore;
joining the tubular structure with another tubular structure to form a continuous passageway therethrough if the absence of contamination has been confirmed;
deploying the joined tubular structures in a wellbore that penetrates a hydrocarbon-bearing earth formation; and
fluid pumping an optical fiber to deploy the optical fiber within the continuous passageway formed by the joined tubular structures.

* * * * *